United States Patent [19]

Shimizu et al.

[11] Patent Number: 4,647,176

[45] Date of Patent: Mar. 3, 1987

[54] EXTERNAL DISPLAY DEVICE FOR CAMERA

[75] Inventors: Masami Shimizu, Tokyo; Shinichi Matsuyama, Kanagawa, both of Japan

[73] Assignee: Canon Kabushiki Kaisha, Tokyo, Japan

[21] Appl. No.: 683,387

[22] Filed: Dec. 19, 1984

[30] Foreign Application Priority Data

Dec. 20, 1983 [JP] Japan ............................ 58-194921[U]

[51] Int. Cl.<sup>4</sup> ............................................. G03B 17/18
[52] U.S. Cl. .................... 354/475; 354/288; 354/289.1
[58] Field of Search ............... 354/465, 471, 474, 475, 354/217, 218, 289.1, 289.12, 288

[56] References Cited

U.S. PATENT DOCUMENTS

| 4,286,849 | 9/1981 | Uchidoi et al. | 354/289.12 |
| 4,298,257 | 11/1981 | Togo | 354/217 |
| 4,436,397 | 3/1984 | Kobayashi | 354/465 |
| 4,461,560 | 7/1984 | Yoshino et al. | 354/475 |
| 4,483,601 | 11/1984 | Sekida et al. | 354/288 |

FOREIGN PATENT DOCUMENTS

| 0078033 | 5/1982 | Japan | 354/474 |
| 0198032 | 11/1983 | Japan | 354/471 |

Primary Examiner—Russell E. Adams
Attorney, Agent, or Firm—Toren, McGeady and Goldberg

[57] ABSTRACT

An external display device for displaying photographic information of varied kinds for a camera uses a numerical display part for selectively displaying numerical photographic information of different kinds and a photography mode display part for displaying different photography modes.

11 Claims, 13 Drawing Figures

FIG.4

| SEGMENT DISPLAY PART | 1880 | | 1880 |
|---|---|---|---|
| LARGE ↑ ISO/ASA | 1600 1250 1000 800 650 500 400 320 250 200 160 125 100 | ISO/ASA ↓ SMALL | 80 64 50 40 32 25 20 16 12 10 8 6 |

FIG. 13

| SEGMENT DISPLAY PART | 1880 | | 1880 |
|---|---|---|---|
| UP COUNT ↑ FAST | 1000<br>750<br>500<br>350<br>250<br>180<br>125<br>90<br>60<br>45<br>30<br>20<br>15 | DOWN COUNT ↓ SLOW | 10<br>8<br>6<br>4<br>3<br>2<br>1" |

EXTERNAL DISPLAY DEVICE FOR CAMERA

BACKGROUND OF THE INVENTION

1. Field of the Invention

This invention relates to an external display device for a camera having a numerical display part which displays numerical photographic information on film sensitivity, the number of frames of film, etc. and a mode display part for displaying different photography modes.

2. Description of the Prior Art

Heretofore, cameras have had varied kinds of information required for photography set by some mechanical means such as a dial, etc. and then have had the set information displayed. Meanwhile, the recent advancement of applications of electronic technology to cameras has resulted in propositions for multi-mode controlled cameras which can be set in different photography modes by selectively shifting the position of an operation member. Some of these propositions have already been put into practice. A camera of this kind uses an operation member such as a lever for selective switching. However, in cameras having many different photography modes and the switching arrangement with an operation member, their operability has not been satisfactory. To solve this problem, some improvements have been proposed. For example, U.S. Pat. No. 4,286,849 has disclosed a camera, in which: A push button is disposed at a suitable part on the outside of the camera body. The camera consecutively shifts from one photography mode to another with the push button continuously pushed and is set in a desired photography mode when the push button is released. Furthermore, information on the number of film frames photographed, a self-timer operating time, a bulb exposure time or the like is set by pushing a push button in the same manner. With photography information set in that manner, the numerical value is displayed on the upper surface of a camera body by means of a display device in a numerical value of several figures, each consisting of seven segments.

In accordance with the arrangement of the above camera, a plurality of photography information values are displayed with many seven-segment figures arranged on the upper external surface of the camera. However, the display space available on the upper external surface of a camera is limited and makes it difficult to have many different numerical displays, since the size of each figure becomes too small for easy observation.

Meanwhile, U.S. patent application Ser. No. 491,052 has disclosed an external display device. In this case, a display device for different photography modes is on the upper surface of a camera having only a photography mode selected by the photographer and displayed by some illumination means or the like. However, in accordance with this arrangement, it is only the selected mode that is observable while all other photography modes disappear from the display. It is therefore impossible for the photographer to quickly know the other modes which are available for selection. Whereas, in actual photography, it is sometimes necessary to first see all the available photography modes, one after another, before a specific mode is selected. In that event, the photographer is likely to miss a shutter chance.

It is a principal object of this invention to provide an external display device for a camera which displays photographic information on the outside of the camera in a satisfactory manner.

SUMMARY OF THE INVENTION

An external display device for a camera including a 7-segment display part capable of displaying a plurality of figures from "0" to "9"; a fixed figure pattern display part consisting of a figure "1" which is disposed in front of the 7-segment display part and a pattern of a figure "0" which is disposed behind the 7-segment display part; a first photographic information display circuit arranged to control only the 7-segment display part by operating or not operating the latter with the number of figures of the 7-segment display part arranged to be the maximum number of figures to be displayed under the control thereof; and a second photographic information display circuit arranged to control the 7-segment display part and the fixed figure pattern display part by causing the 7-segment display part and the fixed pattern display part to light up and to become extinct with a sum of figures of both the display parts arranged to be the maximum number of figures to be displayed under the control thereof.

The above and further specific objects and features of the invention will become apparent from the following detailed description of a preferred embodiment thereof taken in conjunction with the accompanying drawings.

BRIEF DESCRIPTION OF THE DRAWINGS

FIG. 4 shows film sensitivity information which can be displayed by the external display device shown in FIG. 3.

FIG. 13 shows shutter time information which can be displayed by the external display device shown in FIG. 3.

DETAILED DESCRIPTION OF THE PREFERRED EMBODIMENT

Figure 1:
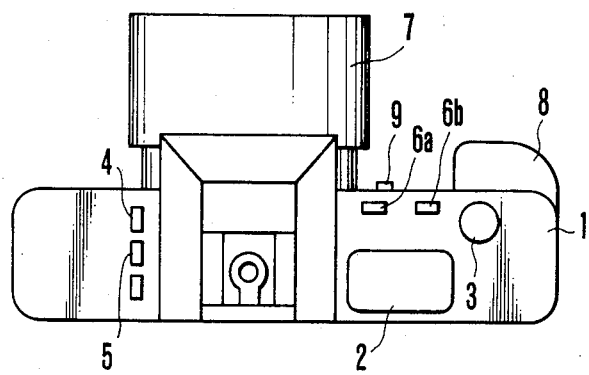
FIG. 1 is a plan view of a camera in an embodiment of this invention.
Figure 2:
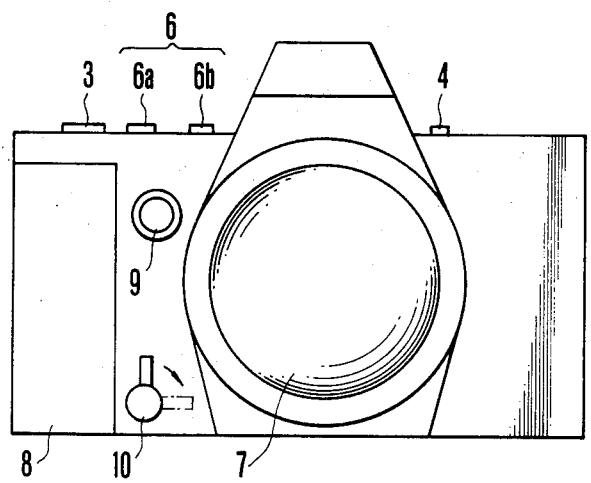
FIG. 2 is a front view of the same camera.

FIG. 1 is a plan view of a camera having an external display device arranged according to this invention. FIG. 2 is a front view of the same camera. The illustration includes an upper lid 1 of the camera body; an external display device 2 which is a liquid crystal display device in this specific embodiment (hereinafter, "the liquid crystal device becomes operative or inoperative" and is expressed as "the liquid crystal device lights up or becomes extinct"); a shutter release button 3 which turns on a light measurement start switch (not shown) by the first half stroke (a first step) thereof and turns on a shutter release switch by the second half stroke thereof as will be further described later; a photography mode selection button 4 which can select various kinds of exposure control for selection of a photography mode; a film sensitivity value selection button 5 for selection of a film sensitivity value; shifting buttons 6 which change the set states of the photography modes and film sensitivity and include an up-shift button 6a and a down-shift button 6b; a photo-taking lens 7; a grip 8 for a firm grip on the camera; a light measurement start button 9 which functions in the same manner as the first half stroke of the shutter release button 3; and a self-timer lever 10 which brings about a self-timer photography mode when bent in the direction of an arrow indicated by a broken line.

Figure 3:
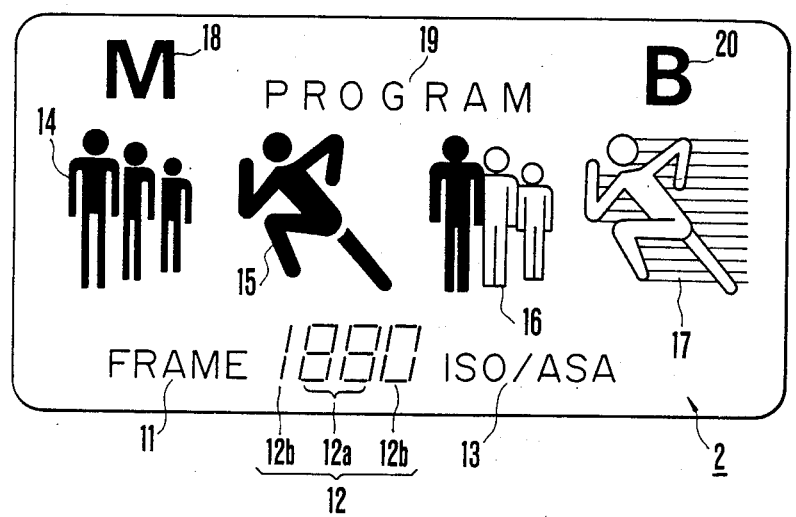
FIG. 3 is an illustration showing an external display device according to this invention in a fully lit condition.

FIG. 3 shows the external display device 2 shown in FIG. 1 fully lit. The illustration includes a literal pattern 11 which reads "FRAME" and lights up when a number of frames of film is to be displayed at a segment display part 12. The display part 12 consists of a seven-segment display part 12a for displaying two figures; and single-segment pattern fixed-figure display parts 12b for displaying two fixed figures. A pattern 13 reading "ISO/ASA" lights up when a film sensitivity value is displayed at the segment display part 12. A pictographic pattern 14 depicts an aperture priority mode (hereinafter referred to as a pan-focus mode) in which the photo-taking lens 7 is stopped down to deepen the focus depth. A pictographic pattern 15 depicts a shutter time priority mode (hereinafter referred to as a stop motion mode) in which a high shutter speed is used. A pictographic pattern 16 depicts an aperture priority mode (hereinafter referred to as a gradation mode) in which a larger aperture opening is used to decrease the focus depth. A pictographic pattern 17 depicts a shutter priority mode (hereinafter referred to as a panning shot mode) in which a low shutter speed is used for panning or the like. A literal pattern 18 reading "M" lights up when an auto-manual selection lever (not shown) is shifted to a manual position thereof. With the manual position of the lever selected, when a bulb exposure photography mode is selected by means of a button (not shown), another literal pattern 20 reading "B" lights up to inform the photographer that the camera has been shifted to the bulb exposure photography mode. Upon commencement of the bulb exposure photography process, the segment display part 12 displays a count value of the bulb exposure time. The segment display part 12 shows the number of film frames exposed, the film sensitivity value (which is displayed at every ⅓ Ev, between ISO/ASA values 1600 and 6 as shown in FIG. 4) and the bulb exposure time (which is displayed every sec between 0 and 199 sec) as mentioned above. In addition, the segment display part 12 shows a down-count value at every second between 10 sec and 0 sec in the self-timer photography mode. A literal pattern 19 reading "PROGRAM" indicates the photography mode of the camera. This pattern 19 is always lit during normal photography. In the event that the pattern 19 alone is light, this indicates that the camera is in a standard program mode (hereinafter referred to as a normal program mode) in which a frequently employed aperture value is used in combination with a frequently employed shutter time value.

Figure 5:
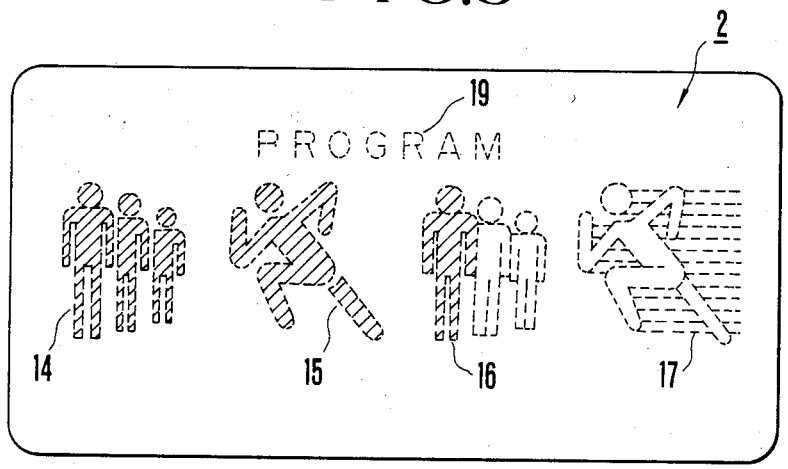
FIG. 5 is an illustration showing the same external display device in a fully extinguished state.

FIG. 5 shows the external display device 2 of FIG. 3 completely extinguished. Under this condition, the patterns depicting the various photography modes are halfway visible (see FIG. 7).

Figure 6:
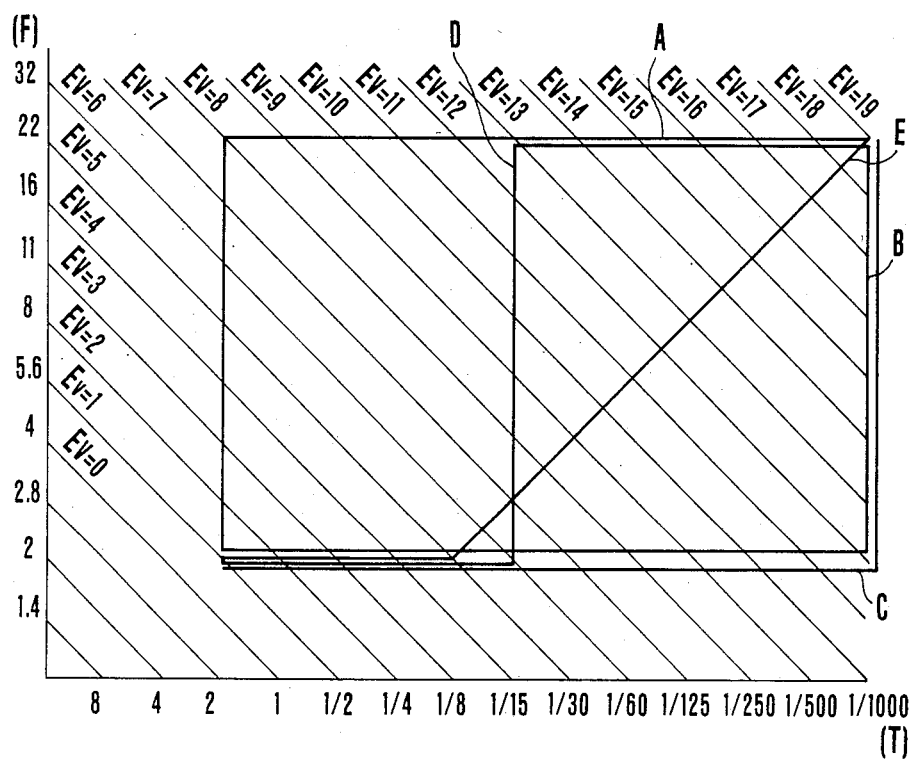
FIG. 6 is an illustration showing, by way of example, the program lines of the camera shown in FIG. 1.

FIG. 6 shows the program lines of the camera shown in FIG. 1. In the drawing, the axis of ordinate shows aperture values (F); the axis of abscissa shutter time values (T); and sealed exposure values Ev (light values Lv at ISO/ASA 100). A line A shows the pan-focus mode. In the pan-focus mode, a shutter time value T=2 and aperture values F=2-22 are used for exposure values Ev=1-8; and shutter time values T=2-1/1000 and an aperture value F=22 are used for exposure values Ev=8-19. A line B shows the stop motion mode, in which: The shutter time values T=2-1/1000 and an aperture value F=2 are used for exposure values Ev=-1-12; and a shutter time value T=1/1000 and aperture values F=2-22 are used for exposure values Ev=-12-19. A line C shows the gradation mode, which is programed in a manner similar to the stop motion mode. A line D shows the panning shot mode, in which: Shutter time values T=2-1/15 and an aperture value F=2 are used for exposure values Ev=1-6; a shutter time value T=1/15 and aperture values F=2-22 are used for exposure values Ev=6-13; and shutter time values T=1/15-1/1000 and an aperture value F=22 for exposure values Ev=13-19. A line E shows the normal program mode, in which: The aperture value remains at F=2 for shutter time values T=2-⅛ (exposure values Ev=1-5). For brightness greater than the brightness applicable to this portion of the line E, the aperture value-and-shutter time value combinations are programed along a line portion connecting a combination of an aperture value F=22 and a shutter time value T=1/1000 to another combination of an aperture value F=2 and a shutter time value T=⅛. Various picture effects are attainable by this embodiment within the programed ranges, which are:

A. Pan-focus mode: Ev=13-19, aperture value F=22

B. Stop motion mode: Ev=11-19, shutter time values T=1/500-1/1000

C. Gradation mode: Ev=6-13, aperture values F=2-2.8 d. Panning shot mode: Ev=5-14, shutter time values T=⅛-1/30

E. Normal program mode: Ev=1-19

Furthermore, for a camera to be used by a beginning photographer, the shutter time values T are programed for shutter speed higher than 1/15.

Figure 7:
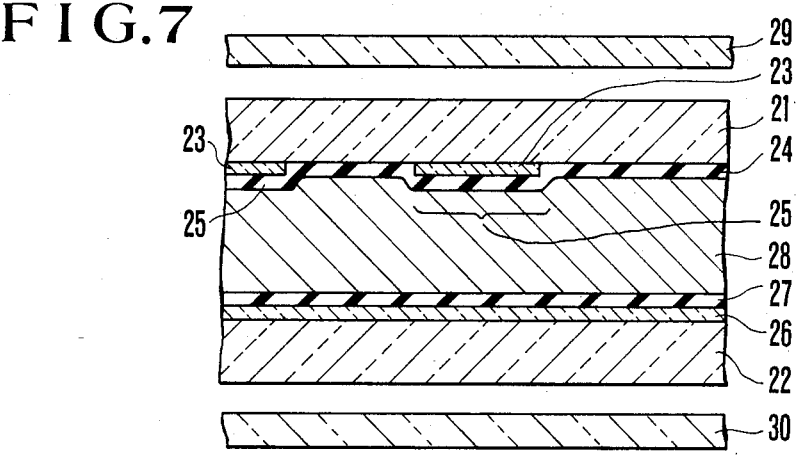
FIG. 7 is a sectional view showing the external display device of FIG. 3.

FIG. 7 is a sectional view of the external display device 2, which is a liquid crystal display device in this specific embodiment. The illustration includes substrates 21 and 22 which are made of a glass plate or a plastic plate. Electrodes 23 which are patternized into predetermined shapes are applied to the inner surface of the substrate 21 and are covered with an insulating film 24. The electrodes 23 are formed by a transparent electric conductive substance such as indium oxide, tin oxide or the like. The insulating film 24 is made of a dyeable material which is generally selected from a group of organic high molecular substances such as polyvinyl alcohol, gelatin, polyamide, polyester, etc. This insulating film 24 includes electrode covering parts 25 which cover the electrodes 23 and are dyed by a suitable method into colors such as white, black, gray, blue, etc. The electrode covering parts 25 are located only at the patterns 14-17 and 19 as shown in FIG. 3 and are halfway visible from outside as shown in FIG. 5. Another insulating film 27 is provided over another electrode 26 and is opposed to the insulating film 24. These insulating films 24 and 27 are subjected to an orientation treatment which is carried out by rubbing the insulating film 24 in the direction intersecting the other insulating film 27, which is provided on the confronting electrode 26. A liquid crystal 28, which is interposed between these insulating films 24 and 27, is thus torsionally oriented at an angle of 90°. The liquid crystal 28 is formed with a nematic liquid crystal having a positive dielectric anisotropic property. Polarizing plates 29 and 30, which are in a cross Nicol state, are disposed on the outer sides of the liquid crystal cell 28 which is arranged in the above-stated manner.

Figure 8:
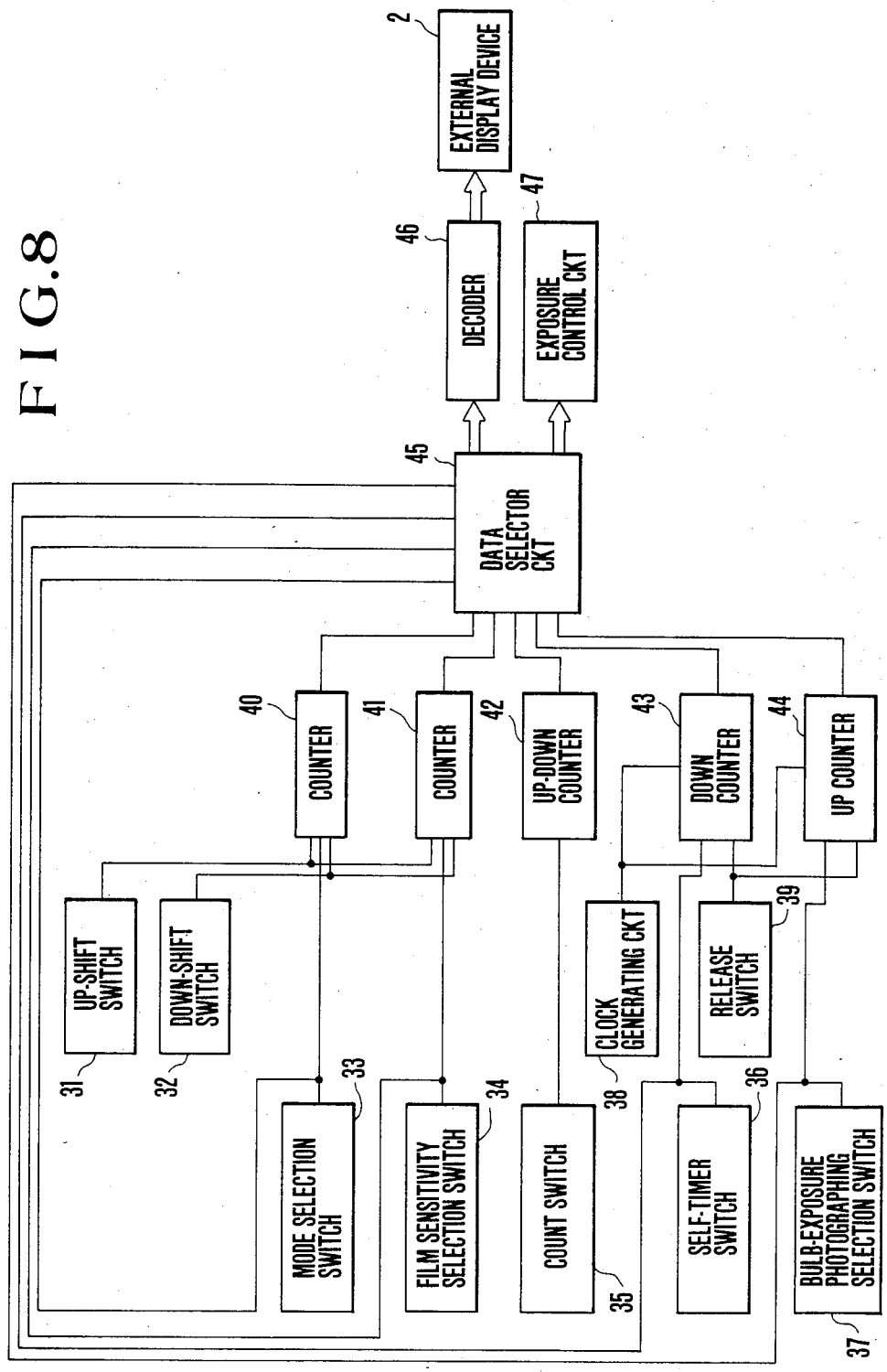
FIG. 8 is a circuit block diagram showing the circuit arrangement of the same embodiment.

FIG. 8 is a block diagram showing, by way of example, an embodiment of this invention together with parts in association therewith. The illustration includes an up-shift switch 31 which turns on when the up-shift button 6a is depressed; a down-shift switch 32 which turns on when the down-shift button 6b is depressed; a mode selection switch 33 which turns on when the photography mode selection button 4 is depressed; a film sensitivity value selection switch 34 which turns on when the film sensitivity value selection button 5 is depressed; a count switch 35 which turns on and off every time one frame portion of the film is fed for counting the number of film frames photographed, the switch 35 turns on and off, for example, in response to the rotation of a sprocket; a self-timer switch 36 turns on when the self-timer lever 10 is set into the position indicated by the broken line in FIG. 2; a bulb exposure photography selection switch 37 turns on when the bulb exposure photography mode is selected by means of a button (not shown); a clock pulse generating circuit 38; and a shutter release switch which turns on when the shutter release button 3 is pushed a second half stroke.

A counter 40 memorizes the various photography modes including the pan-focus mode, the stop motion mode, the gradation mode; the panning shot mode and the normal program mode. The output of the counter 40 shifts in the order of the pan-focus mode→the stop motion mode→the gradation mode→the panning shot mode→the normal program mode→the pan-focus mode→ - - - when the mode selection switch 33 and the up-shift switch 31 turn on and shifts in the reverse order, i.e. the pan-focus mode→the normal program mode→the panning shot mode→the stop motion mode→the pan-focus mode→ - - - , one after another, when the mode selection switch 33 and the down-shift switch 32 turn on. A counter 41 memorizes the film sensitivity values shown in FIG. 4. An up-down counter 42 receives a pulse every time the count switch 35 turns on and off. The counter 42 up counts when the film is wound up and down counts when the film is rewound. A down counter 43 has its count content set at "10" when the self-timer switch 36 is off and down counts in such a way as 10, 9, 8, - - - on the basis of the clock pulses which come, one by one, every second from the clock pulse generating circuit 38 when a shutter release switch 39 turns on after the self-timer switch 36 turns on. An up counter 44 up counts in such a way as 1, 2, 3, - - - on the basis of the clock pulses which come every second from the clock pulse generating circuit 38 when the release switch 39 turns on, after the bulb exposure photography mode selection switch 37 turns on. A data selector circuit 45 supplies a decoder 46 and an exposure control circuit 47 respectively with a signal produced from the counter 40 when the mode selection switch 33 turns on; with a signal from the counter 41 when the film sensitivity value selection switch 34 turns on; with a signal from the down counter 43 when the self-timer switch 36 turns on; with a signal from the up counter 44 when the bulb exposure photography mode selection switch 37 turns on; and with a signal from the up-down counter 42 when all the switches 33, 34, 36 and 37 are off.

The operation of the embodiment is as follows: Referring to FIGS. 9-13, a camera which is programed in the manner described in the foregoing is assumed to have a lens 7 of a maximum aperture F=2 and a minimum aperture F=22 mounted thereon and to be loaded with film of an ISO/ASA sensitivity value of 100. The focal length of the lens 7 is assumed to be 50 mm. When the power supply of the camera is switched on, the pattern 11 which displays the number of photographed frames of film lights up. Then, at the segment display part 12, the segment display part 12a solely displays the number of film frames photographed. In other words, at that time, the switches 33, 34, 36 and 37 are all off. Therefore, the data selector circuit 45 allows the signal from the up-down counter 42 to be supplied via the decoder 46 to the external display device 2. As a result, the number of film frames photographed by that time is displayed at the external display device 2. In selecting a desired photography mode, the photography mode selection button 4 is pushed. The mode selection switch 33 then turns on. The count content of the counter 40 is displayed at the external display device 2. More specifically, a signal representing a photography mode which is, for example, a pan-focus mode is then supplied via the data selector circuit 45 and the decoder 46 to the external display device 2. Upon receipt of this signal, at the display device 2, the pattern 19 which indicates that the display is a photography mode display and another pattern 14 which indicates the pan-focus mode lights up. At that instant, the pattern 11 which indicates the display of the number of the photographed film frame and the seven-segment display part 12a both become extinct. This clearly shows the photographer that the camera is in a mode for changing the photography mode. Under this condition, the photography mode is shiftable by pushing the shift button 6. For example, when the up-shift button 6a is pushed while pushing the photography mode selection button 4, the up-shift switch 31 is turned on. A high level signal is supplied to the counter 40. The count content of the counter 40 then shifts from one mode to another as follows: pan-focus mode→stop motion mode→gradation mode→panning mode→normal program mode→pan-focus mode→ - - - . The display patterns 14, 15, 16, 17, 19 of the external display device 2 also repeatedly shift, one after another, in the following manner: patterns 14 and 19→patterns 15 and 19→patterns 16 and 19→patterns 17 and 19→pattern 19 alone→patterns 14 and 19→ - - - . Then, with the up-shift button 6a released, when a pattern depicting the desired photography mode is displayed, the up-shift switch 31 turns off. The count content of the counter 40 no longer changes. The camera is thus set in the desired photography mode. Furthermore, if the down shift button 6b is pushed while pushing the photography mode selection button 4, the patterns 14, 15, 16, 17, 19 then shift in an order which is the reverse of the above-stated order, as follows: patterns 14 and 19→pattern 19 alone→patterns 17 and 19→patterns 16 and 19→patterns 15 and 19→patterns 14 and 19→ - - - .

Figure 9:
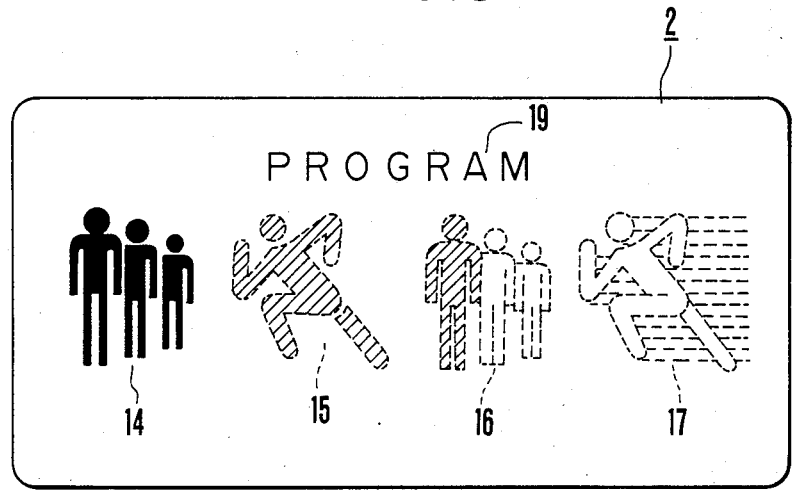
FIG. 9 is an illustration showing the external display device of FIG. 3 displaying the photography mode setting.
Figure 10:
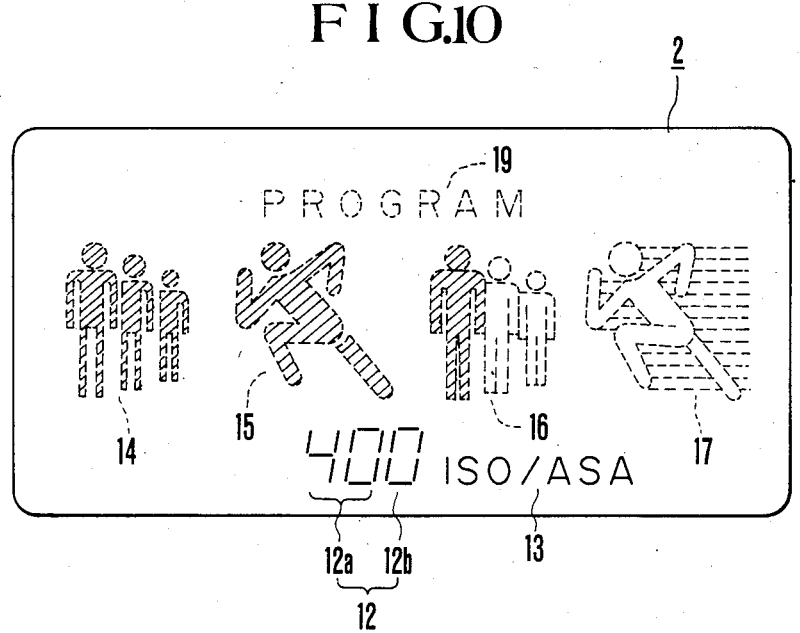
FIG. 10 shows the external display device of FIG. 3 displaying the film sensitivity value setting.

Since the molecular axis of the nematic liquid crystal 28 is oriented toward the electric field, incident light is cut off when a voltage is applied between the electrode 23 and another electrode 26, for example, causing the patterns 14 and 19 which represent the set photography mode (pan-focus mode) alone to be displayed in a black color as shown in FIG. 9. This black display is clearly distinguishable from the halfway display of other patterns 15, 16 and 17, which are visible in the color with which they are dyed, as shown by broken lines in FIG. 9. This halfway display of other patterns 15, 16 and 17 informs the photographer of other selectable photography modes. In addition, the halfway display also lets the photographer judge how long or how many times the shift button 6 should be pushed in order to obtain another selectable photography mode.

In selecting a film sensitivity value, the embodiment operates as follows: When the film sensitivity value selection button 5 is pushed, the film sensitivity value selection switch 34 turns on. The count content of the counter 41 is displayed on the external display device 2. This display represents a previously set film sensitivity value. Assuming that, in this case, a signal corresponding to a previously selected ISO/ASA sensitivity value of 400 is supplied via the data selector circuit 45 and the decoder 46 to the external display device 2 to display the film sensitivity value, the pattern 13 which shows that the display is a film sensitivity display and both the segment display parts 12a and 12b of the segment display part 12 light up to give a display reading "400 ISO/ASA". At that time, since all other patterns are extinct, this display informs the photographer that the camera is in a mode for selection of a film sensitivity value. The film sensitivity value is selectable under this condition by pushing the shift button 6. For example, if the up-shift button 6a is then pushed while pushing the film sensitivity value selection button 5, the up-shift switch 31 turns on, supplying a high level signal to the counter 41. The count content of the counter 41 then increases at every ⅓ step (see FIG. 4) in the following manner: 6→8 - - - 100 - - - 400 - - - 1250→1600 representing ISO/ASA sensitivity values. Then, the count content obtained at every ⅓ step at the counter 41 is displayed on the external display device 2. When the shifting value reaches a desired film sensitivity value, the up-shift button 6a is released. The up-shift switch 31 then turns off. The count content of the counter 41 no longer changes, so that the camera is set at the desired film sensitivity value. If the down-shift button 6b is pushed while the film sensitivity value selection button 5 is pushed, the ISO/ASA value displayed by the whole segment display part 12 of the external display device 2 decreases every ⅓ step in the reverse order to the above-stated order, i.e. in the following manner: 1600→1250 - - - 400 - - - 100 - - - 8→6. Assuming that the camera is loaded with a film of an ISO/ASA sensitivity value of 100, the shift button 6 is released when the ISO/ASA value of "100" is displayed.

When the film sensitivity value selection button 5 is released upon completion of the film sensitivity value setting, the pattern 13 becomes extinct and the pattern 11 lights up. Then, the seven-segment display part 12a of the segment display part 12 shows the number of film frames photographed.

Figure 11:
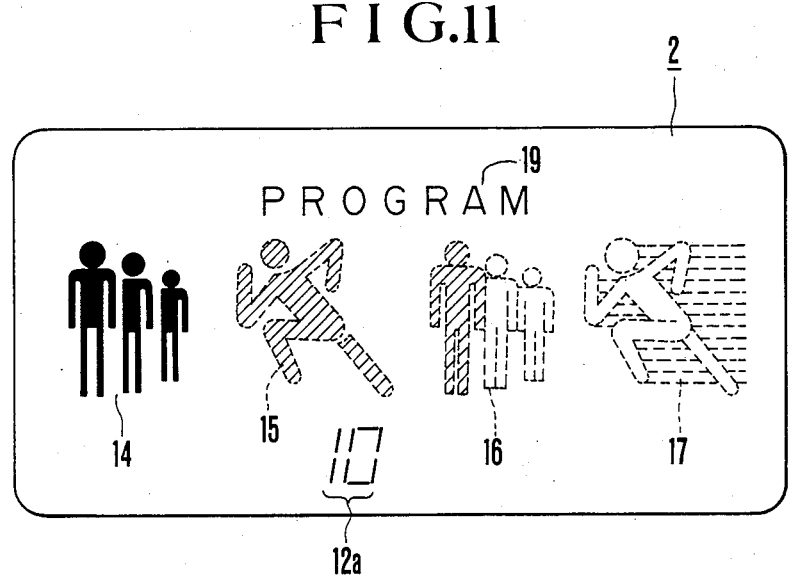
FIG. 11 shows the external display device of FIG. 3 displaying a self-timer photography mode.

In the self-timer photography mode and in feeding the film, the embodiment operates as follows: The self-timer lever 10, which is shown in FIG. 2, is set in the self-timer mode position. After that, when the shutter release button 3 is pushed down a second half stroke, the self-timer switch 36 turns on. At the down counter 43, the count number is preset at 10. Following this, when the shutter release switch 39 turns on, the pattern 11 which shows the number display of the film frame and the seven-segment display part 12a, which shows the film frame number photographed, become extinct at the external display device 2. At the same time, the count content of the down counter 43 is displayed as shown in FIG. 11. The down counter 43 begins to down count in such a way as 10, 9, 8, - - - on the basis of the clock pulses which come every second from the clock pulse generating circuit 38. Each count number (or the self-timer time) thus obtained by down counting is displayed at the seven-segment display part 12a of the external display device 2. The shutter release process of the camera begins when the display becomes "0".

Upon completion of the shutter release process, the count content of the up-down counter 42 is displayed by the seven-segment display part 12a and the pattern 11 at the external display device 2 in the same manner as before. Meanwhile, upon completion of the shutter release, the film is wound up by a motor driven winding device (not shown). The count switch 35 turns on and off based on this film winding operation. As a result, the count number of the up-down counter 42 increases by one. Then, the number displayed by the seven-segment display part 12a also increases by one.

Figure 12:
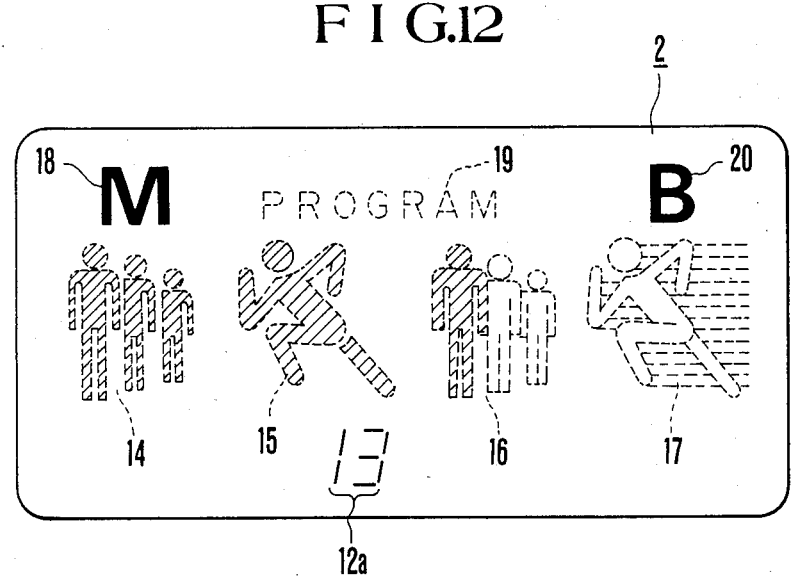
FIG. 12 shows the external display device of FIG. 3 displaying a bulb-exposure photography mode.

In the bulb exposure photography mode, the embodiment operates as follows: The photo-taking lens 7 which is shown in FIGS. 1 and 2 is provided with an auto-manual selection lever (not shown). When this selection lever is shifted to a manual operation position thereof, the pattern 18 lights up at the external display device 2. Then, if the bulb-exposure photography mode is selected by means of a button (not shown), the pattern 20 of the external display device 2 lights up. Following this, when the shutter release button 3 is pushed down a second half stroke, the bulb exposure photography mode selection switch 37 and the shutter release switch 39 turn on. The up counter 44 is reset when the bulb exposure photography mode selection switch 37 turns on. The up counter 44 then begins to up count, 0, 1, 2, 3, - - - , on the basis of the clock pulses coming, one by one every second from the clock pulse generating circuit 38. Each number thus counted is displayed by the segment display part 12 of the external display device 2. The maximum bulb exposure time is 30 sec. Therefore, the up counter 44 is capable of counting up to 30. FIG. 12 shows a display made 13 sec after commencement of the count.

FIG. 13 shows, by way of example, the shutter time information to be displayed by the segment display part 12 of the external display device 2.

In this embodiment, the segment display part 12 which consists of the two-figure, 7-segment part 12a and the two-fixed-figure part 12b is capable of selectively displaying different kinds of numerical information including the number of film frames photographed or exposed, the film sensitivity value, the self-timer time and the bulb exposure time. This arrangement, therefore, permits provision of the external display device 2 in the greatest possible size within a limited flat space available on the upper surface of the camera body. Photographic information can be displayed in the largest possible figures at the external display device 2 as required, so that the photographer can be clearly and accurately informed of necessary photographic information. Furthermore, with the segment display part 12 arranged as described, all the information required for photography by the camera can be displayed with the least number of segments. Therefore, the display device driving circuit can be simplified and the number of connections required between the driving circuit and the display device 2 can be reduced. This is an advantage for the electrical circuit arrangement in practical applications. In accordance with this invention, the photography modes not selected are displayed halfway. That arrangement enables the photographer to know all the selectable photography modes with the camera.

In the embodiment described, the segment display part 12 represents a numerical display part; the data selector circuit 45 represents selection means; and the data selector circuit 45, the decoder 46 and the external display device 2 jointly represent an external display device of the invention.

In the foregoing description of the embodiment, the segment display part 12 is described, by way of example, as arranged to show the film sensitivity information. However, the segment display part 12 of course can be arranged to show shutter speed or time information based on a measured light value when a light measurement switch (not shown) turns on; and to be used for displaying a shutter speed setting value in case of a shutter speed priority camera. In that event, the shutter speed or time display may be arranged as shown in FIG. 13. The shift button 6 is arranged to have the photographic information consecutively change from one information to another when the button is continuously pushed. This arrangement can be easily changed to have the photographic information changed every time the shift button is pushed once. The external display device 2 is arranged to show only the number of the film frame exposed while all the operation buttons are not under the pushing operations. This arrangement, however, may be changed to have the number of exposed film frames displayed together with the exsisting photographing mode.

In accordance with this invention, as described in the foregoing: A numerical display part is arranged to be capable of numerically displaying any desired one of different kinds of photographic information as necessary. Therefore, the display device is capable of displaying a greater number of different kinds of photographic information than the prior art display devices. Further, in the external display device of the embodiment described, the whole segment display part 12 including the display parts 12a and 12b is used for displaying a maximum of four figures required, like in the case of a display of a film sensitivity value. Meanwhile, for the information which never requires four figures, such as information on the film counter, the self-timer, etc., the seven-segment display part 12a which covers two figures within the segment display part 12 is alone used. Therefore, the seven-segment display arrangement required by the most of the display patterns can be limited to two figures for simplification of the segment display part. Further, in accordance with the embodiment given, the patterns 14–17 and 19 which depict the photographing modes are arranged to be normally displayed halfway. Therefore, this arrangement enables the photographer to know at once all the selectable photographing modes other than the currently selected one and also to estimate promptly the length of time and the number of times required for a shifting operation.

What is claimed is:

1. An external display device for a camera comprising:
   (a) an electro-optical display panel consisting of one unit;
   (b) segments for digit display of at least four figures formed in said display panel;
   (c) means for forming a plurality of types of photographing information to be displayed by said digit display segments, said means having at least shutter time information and time counting information in bulb exposure mode;
   (d) selecting means for selecting one of the plurality of photographing information to be displayed by said digit display segments; and
   (e) display means for causing said digit display segments to display the selected one of the plurality of types of photographing information by said selecting means, whereby when said shutter time information is selected, said display means renders all the figures of said digit display elements possible to display, while when said time counting information is selected, the least significant figure of said digit display segments is always rendered non-operative, and at least two of the other figures are rendered possible to display.

2. A device according to claim 1, wherein said digit display segments consist of four figures, the most significant figure being made of fixed digit segments for "1", and the least significant figure being made of fixed digit segments for "0".

3. A device according to claim 1, wherein said electro-optical panel is constructed by use of a liquid crystal display unit.

4. An external display device for a camera comprising:
   (a) an electro-optical display panel consisting of one unit;
   (b) segments for digit display of at least four figures formed in said display panel;
   (c) means for forming a plurality of types of photographing information to be displayed by said digit display segments, said means having at least shutter time information, film sensitivity information and time counting information in bulb exposure mode;
   (d) selecting means for selecting one of the plurality of photographing information to be displayed by said digit display segments; and
   (e) display means for causing said digit display segments to display the selected one of the plurality of types of photographing information by said selecting means, whereby when said shutter time information and said film sensitivity information are selected, said display means renders all the figures of said digit display elements possible to display, while when said time counting information is selected, the least significant figure of said digit display segments is always rendered non-operative, and at least two of the other figures are rendered possible to display.

5. A device according to claim 4, wherein said digit display segments consist of four figures, the most significant figure being made of fixed digit segments for "1", and the least significant figure being made of fixed digit segments for "0".

6. A device according to claim 1, further comprising film frame information included in said means for forming the plurality of types of photographing information.

7. A device according to claim 4, further comprising film frame information included in said means for forming the plurality of types of photographing information.

8. An external display device for a camera having a plurality of photographing modes, comprising:
 (a) photographing mode selecting means for selecting one of said plurality of photographing modes;
 (b) an electro-optical display unit;
 (c) a plurality of photographing mode display colored patterns of non-changeable patternized to depict said plurality of photographing modes, said display colored patterns being arranged in pictographic shapes, and said display colored patterns being arranged in said electro-optical display unit;
 (d) electro-optical display patterns responsive to electrical control for changing between light shuttering and light permeating states, said display patterns being in the area of said display colored patterns and being formed almost to the shapes of said display colored patterns, and said electro-optical display patterns being arranged in said electro-optical display unit; and
 (e) a display circuit arranged to operate at least one of said electro-optical display patterns according to the operation of said photographing mode selecting means.

9. A device according to claim 8, wherein said photographing mode selecting means is arranged to form program modes set according to a plurality of program lines.

10. A device according to claim 8, wherein a liquid crystal display device is employed as the external display device.

11. A device according to claim 10, wherein said liquid crystal display device comprises at least two polarizing plates, two transparent substrates, combinational electrodes, and a nematic liquid crystal substance interposed in-between said two transparent substrates.

* * * * *